July 13, 1943. H. J. EKLUND 2,324,142
RIVET AND METHOD OF MAKING SAME
Filed April 3, 1941 2 Sheets-Sheet 1
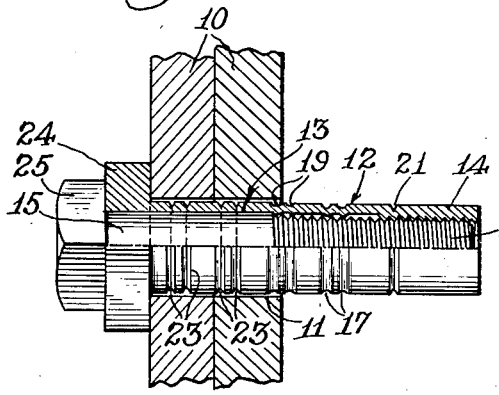
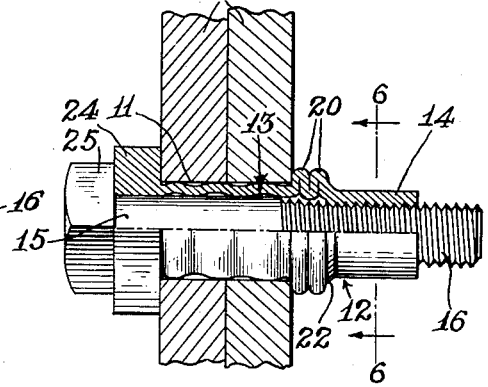
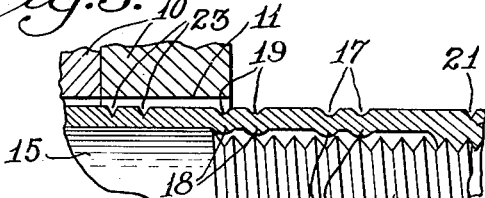
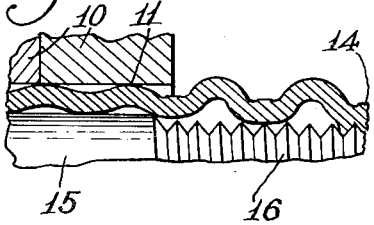
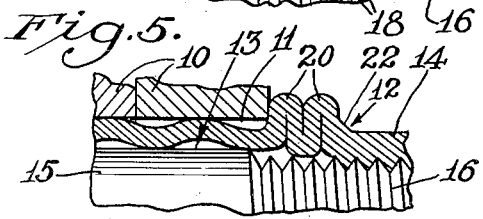
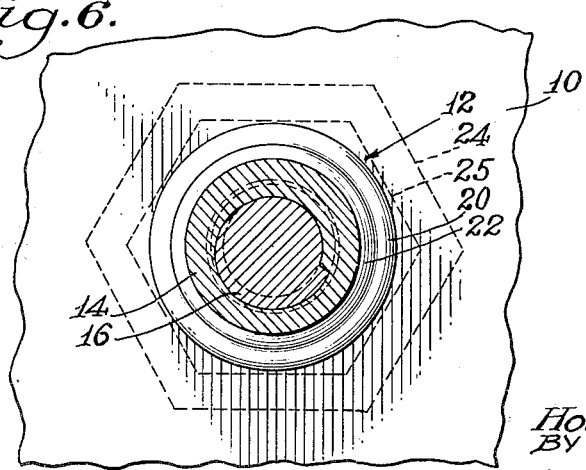
Inventor
Howard J. Eklund
BY
Parker, Carlson, Pitzner & Hubbard
Attorneys.

Inventor
Howard J. Eklund
BY
Parker, Carlson, Pitzner & Hubbard
Attorneys

Patented July 13, 1943

2,324,142

UNITED STATES PATENT OFFICE 2,324,142

RIVET AND METHOD OF MAKING SAME

Howard J. Eklund, Chicago, Ill., assignor to Rolyan Corporation, Chicago, Ill., a corporation of Illinois Application April 3, 1941, Serial No. 386,654

15 Claims. (Cl. 10—27)

The invention relates generally to rivets and more particularly to a rivet which may be inserted and set in the structure to be riveted with access only at one side of such structure as distinguished from the ordinary type of rivet for which access must be had at both sides of the structure.

The general object of the invention is to provide a novel rivet of the foregoing type, which firmly holds the parts riveted in place, which has a strength comparable with an ordinary type of rivet and which may be readily set with a minimum of effort.

It is also an object to provide a novel rivet of the type set forth, comprising a tubular member and pin or screw threaded in the former and adapted to upset or collapse the tubular member endwise to cause it to bulb outwardly against the rear or inaccessible face of the structure.

Another object is to provide a rivet comprising a tubular member and pin or screw which not only causes the tubular member to bulb outwardly over the rear face of the structure but also causes the portion of the tubular member within the structure to expand into tight fitting relation with the structure.

A further object is to provide a rivet comprising a tubular member and a pin or screw, in which the tubular member is so constructed as to predetermine the portion thereof that will be bulbed, this construction also being such that proper bulbing will occur with small variations in the total thickness of the structure being riveted.

Still another object of the invention is to provide a rivet of the type set forth, which avoids, in forming the bulbed structure, placing excessive strain localized at any part of the metal of the tubular member that bears the stress on the rivet as a whole.

A still further object is to provide a rivet having a tubular member adapted to be bulbed to set the rivet, and which includes a portion formed during the bulbing operation to reinforce the bulbed structure at the point of greatest stress.

It is also an object to provide a novel method of riveting.

Other objects and advantages will become apparent from the following description taken in connection with the accompanying drawings, in which:

Figure 1 is a view, partially in section, of a rivet embodying the features of the invention and showing the rivet inserted in the structure to be riveted before the rivet is set.

Fig. 2 is a view similar to Figure 1 but showing the rivet after it is set.

Fig. 3 is an enlarged fragmentary sectional view similar to Fig. 1.

Fig. 4 is a view similar to Fig. 3 but showing the rivet in the process of being set.

Fig. 5 is an enlarged fragmentary sectional view similar to Fig. 2.

Fig. 6 is a sectional view taken on the lines 6—6 of the Fig. 2.

Figure 7:
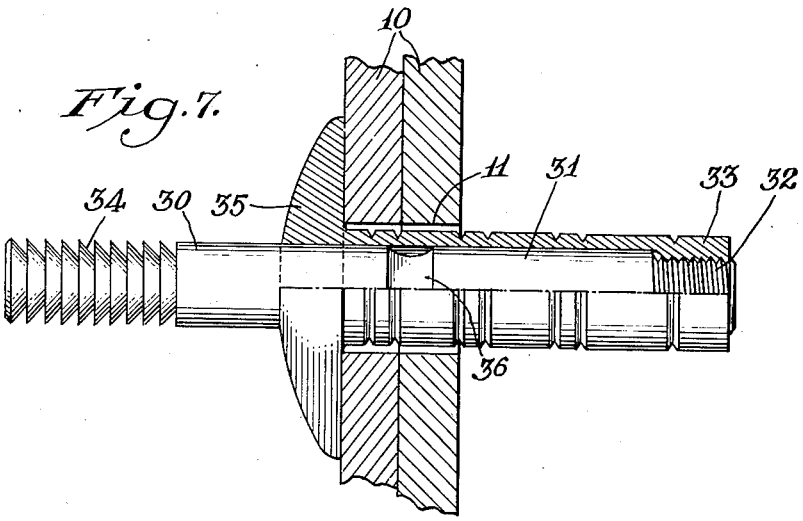
Fig. 7 is a view partially in section of a modified form of rivet.

As mentioned above, a rivet embodying the features of the invention is of the type which may be inserted and set in the structure to be riveted with access only at one side of such structure. The exemplary form of the rivet comprises generally a tubular member and an enclosed pin. The tubular member is adapted to be inserted into the structure to be riveted from one side thereof and is of sufficient length to extend beyond the other side. The pin and tubular member are formed for engagement at the end of the extending portion so that said end portion may be drawn toward the structure to cause the intermediate portion of the tubular member, that is, the portion lying between the structure and the end portion, to bulb outwardly against the face of the structure. At the same time, the portion of the tubular member lying within the structure is caused to buckle or bulb outwardly to the extent permitted by the structure so that it has a tight fit therein. Preferably the pin is in the form of a screw engaging internal threads in the end portion of the tubular member. The drawing action on the end portion to cause the bulbing may be exerted by tightening the screw, in the form shown in Figs. 1 to 6 inclusive, or may be exerted by pulling the screw and applying the reactionary force to the tubular member as in the form shown in Figs. 7, 8 and 9.

The tubular member is so constructed as to predetermine the point at which bulbing occurs. Thus external annular grooves are formed in the tubular member which cause the metal to hug the pin or screw at these points and thereby cause the metal between the pairs of grooves to bulb outwardly. The grooves are preferably placed in slightly spaced pairs with the pairs of grooves spaced from adjacent pairs a sufficient distance to provide metal for bulbing. The slight spacing of the grooves of each pair reduces the angle of bend of the metal at any one point and increases the amount of metal forming the complete bend adjacent the pin, thus greatly strengthening the rivet when it is set. Means in the form of another groove is also placed in the threaded end portion of the tubular member to cause a small part of this threaded portion to bell outwardly and to merge in the bulbed portion to reinforce it.

In the drawings I have illustrated the structure to be riveted as a pair of plates 10, which are provided with an aperture 11 into which the rivet is inserted. The rivet comprises a tubular member indicated generally at 12 and in the form of a cylinder preferably of uniform outside diameter. The tubular member is of sufficient length to extend through the plates 10 and a substantial distance beyond. The end portion of the extending part of the tubular member is formed to be engaged by a pin indicated generally at 13. Preferably the end portion of the tubular member, here indicated at 14, is internally threaded, and the pin 13 is in the form of a screw. The pin 13 comprises a shank portion 15 and a threaded end 16. The shank portion 15 preferably fits snugly within the tubular member so that the end portion 14 of the tubular member has a somewhat greater wall thickness due to the internal threads therein.

The end portion 14 of the tubular member is adapted to be drawn toward the structure by means of the pin 13 and thereby to cause the intermediate portion of the tubular member lying between the structure and the end portion 14 to bulb outwardly against the face of the structure to set the rivet. In the same operation, the portion of the tubular member lying within the aperture 11 is caused to bend outwardly into tight fitting relation with the structure, if the aperture 11 is of larger diameter than the diameter of the tubular member.

One of the prominent features of the invention lies in the formation of the tubular member so as to predetermine the points where bulbing thereof occurs. Preferably a pair of overlying bulbs, indicated at 20, are formed in the extending portion of the rivet. To this end the intermediate portion of the tubular member is externally annularly grooved to cause the metal at the point of grooving to hug tightly against the screw or pin and thereby cause the metal on both sides of the grooving to bulb outwardly.

Preferably the grooving is so formed as to leave a relatively large amount of metal in the inner bend between the two bulb portions which strengthens them against a longitudinal shearing stress. As illustrated, a pair of external annular grooves 17 are formed in the intermediate portion of the tubular member. These grooves constitute in effect a prebending of the metal and greatly facilitate the bulbing operation. Thus if only one groove were used at this point, the metal would have to bend through 180 degrees between the two bulbs. However with the two grooves, the bend is separated into two parts of approximately 90 degrees each thereby putting a great deal less strain on the metal at that point. Moreover it increases the amount of metal utilized to form the bend, over what would be available were a single bend of 180 degrees made, since the metal in the slight space between the two grooves is utilized as part of the bend. In other words, the metal in the bend is prevented from stretching and thinning out to the extent that it would if there were a single bend of 180 degrees.

Preferably the grooves 17 are rolled into the tubular member so that no appreciable reduction in thickness is caused, as would be the case if the grooves were formed by a cut. Rolling of the grooves of course forms ribs 18 on the interior of the tubular member, but to enable the pin 13 to pass by the ribs 18, the threading on the pin extends back along the pin farther than is needed for engagement with the end portion 14 of the tubular member and preferably as far back as the plane of the rear face of the plates 10.

The tubular member is also externally grooved adjacent the rear face of the plates 10 so as to cause the bulbing to start substantially at the plane of this rear face. Preferably the grooving at this point is similar to the grooving in the intermediate portion, in that there is a pair of grooves 19 rolled in the tubular member functioning similarly to the grooves 17. The provision of a pair of grooves at this point facilitates bulbing for slight variations in the total thickness of the plates 10. Thus if the position of the rear face of the plates 10 relative to the grooves 19 varies slightly in this instance, the principal bending will occur in that groove that lies outside the structure but nearest to the face thereof. Such variation in the position of the rear face of the plates 10 might occur from a number of reasons such as warpage of one of the plates relative to the other, burrs or grit holding the plates slightly spaced, and also normal variations in the thickness of the individual plates.

The preferred embodiment of the invention also includes another feature providing additional strength for the bulb portions of the tubular member. To this end the outer of the two bulbed portions 20 is adapted to be reinforced at the point where it joins the end portion 14, by causing a small part of the end portion to bell outwardly and merge into the bulbed portion. To cause such outward belling of the metal, an external groove 21 is formed in the end portion 14 at a short distance from the inner end thereof. Preferably the groove 21 is cut to avoid deformation of the threads. When the end portion 14 is drawn toward the structure, the groove 21 causes the inner end of the threaded portion 14 to bell outwardly at an angle as illustrated at 22, thus adding metal of somewhat greater thickness to the adjacent bulbed portion at that point.

While preferably the aperture 11 in the plates 10 is substantially the size of the tubular member, the rivet is so constructed that, if the aperture 11 is larger, the tubular member will be caused to expand therein, thus sealing the aperture 11. To this end the portion of the tubular member dying within the plates is externally grooved as at 23 to cause the metal at the grooves to hub tightly against the pin and thereby to cause the metal between the grooves to bulb outwardly to the extent permitted by the structure being riveted. Preferably the grooves 23 are formed in pairs similar to the other grooves thereby forming bends in the tubular member hugging the pins tightly at spaced points and at intervening points bearing tightly against the plates 10. The aperture 11 is thus completely sealed. The grooves 23 are in the form of cut grooves since it is desired to have the shank portion of the pin fit snugly within the tubular member at this part of the rivet and a rolled groove would cause a rib to be formed which would prevent such a snug fit.

The rivet shown in Figs. 1 to 6 inclusive is of a form in which the rivet is adapted to be set by tightening the pin or screw to draw the inner end portion of the tubular member toward the structure to form the bulb. Thus the tubular member is provided with a head 24 which is of some non-cylindrical form such as hexagon, and the pin is provided with a head 25 of similar form. In setting the rivet, the tubular member 24 is held against rotation while the screw is turned, thereby drawing the end portion 14 of the tubular member toward the structure and producing the bulbing action.

Figure 8:
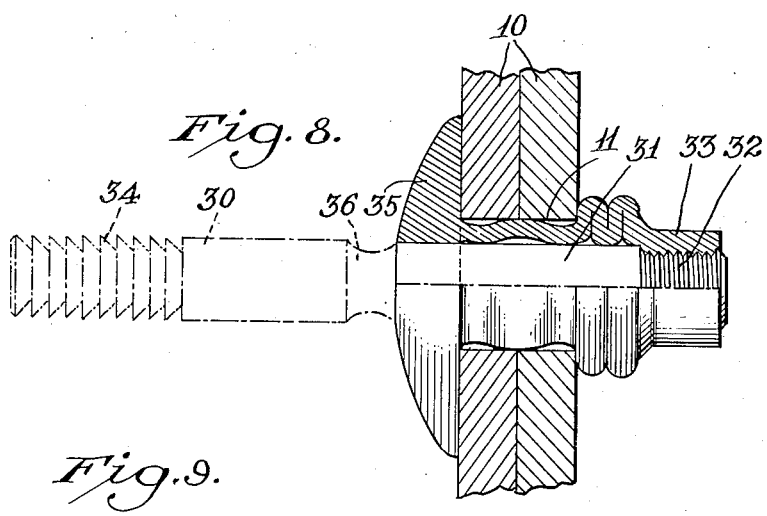
Fig. 8 is a view of the rivet shown in Fig. 7 after it is set.
Figure 9:
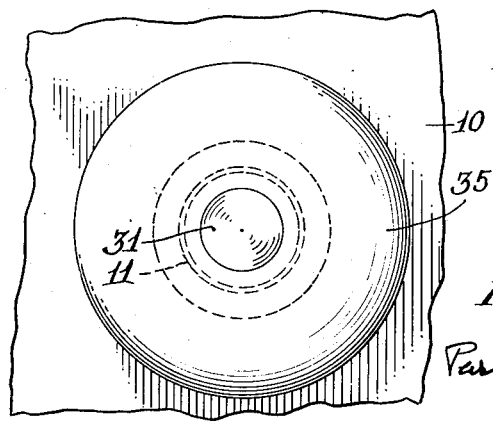
Fig. 9 is a front end view of the rivet shown in Figs. 7 and 8.

In the form of the invention shown in Figs. 7, 8 and 9, the pin comprises an outer shank portion 30 and an inner shank portion 31 located within the tubular member. The shank portion 31 has a threaded end 32 screwed into the end portion 33 of the tubular member. The shank portion 31 extends through the tubular member to the threaded end portion 33 thereof and preferably has a snug fit within the tubular member. Therefore the grooves in this instance are all formed by cutting but are similarly located to the grooves shown in the other embodiment of the invention and function in a generally similar manner.

In this form of the invention, the pin is adapted to be pulled to cause the bulbing action and to this end the front portion of the pin is shaped as at 34 so that it may be readily grasped by a pulling instrument. Such instrument is so arranged that the reactionary force set up by the pulling is exerted against a head 35 formed on the tubular member. The reactionary force thereby holds the tubular member in place while the bulbing action takes place. The length of the shank portion 31 is preferably such that its left hand end, as illustrated in the drawings, will move to a position flush with the head 35 at the completion of the bulbing action, and the two shank portions are connected by a portion 36 of reduced diameter which may be readily broken or sawed off substantially flush with the head 35.

From the foregoing it will be apparent that the rivet disclosed herein will firmly hold the parts being riveted in place and has a strength comparable to an ordinary type of rivet. The location of the bulbs 20 are predetermined by the external annular grooves. By placing these grooves in pairs, excessive strain on the metal at the points of bending is eliminated and additional metal is forced into the bends thereby greatly strengthening the rivet as a whole. Moreover the outer bulbed portion is reinforced by causing a small part of the end portion 14 to bell outwardly and merge with the bulbed portion. By utilizing the pair of grooves adjacent the face of the structure, the rivet will readily accommodate itself to form proper bulbing even though there are slight variations in the total thickness of the structure. The grooving of the portion of the tubular member within the structure causes such portion to readily expand into tight fitting relation with the structure to seal the aperture therethrough. The rivet may be made in either of the two forms, namely, the first form in which the turning or tightening action of the screw effects the bulbing, or the second in which a straight pull is exerted on the pin or screw to cause the bulbing. It will also be apparent that I have provided a novel method of riveting.

I claim as my invention:

1. A rivet assembly comprising, in combination, a tubular member adapted to be inserted into a structure from one side thereof and extending beyond the other side thereof and a pin within said tubular member constructed to engage and draw the end portion of said tubular member at said other side toward said structure, said tubular member having a pair of closely adjacent external annular grooves located closely adjacent the plane of said other side to cause the metal at the groove nearest and outside of said structure to bend inwardly against the pin and the metal between said groove and said end portion to bulb outwardly, the two grooves thereby facilitating the bulbing for varying thicknesses of the structure.

2. A rivet assembly comprising, in combination, a tubular member adapted to be inserted into a structure from one side thereof and extending beyond the other side thereof and a pin within said tubular member constructed to engage and draw the end portion of said tubular member at said other side toward said structure, said tubular member having a pair of closely adjacent but spaced external annular grooves located midway between said other side and said end portion to cause the metal at said grooves to tightly hug the pin and to cause the metal on the respective sides of said pair of grooves to bulb outwardly to form a pair of overlying bulbed portions, the pair of grooves causing the metal in bulbing to bend at two slightly spaced points.

3. A rivet assembly comprising, in combination, a tubular member adapted to be inserted into a structure from one side thereof and extending beyond the other side thereof and a pin within said tubular member constructed to engage and draw the end portion of said tubular member at said other side toward said structure, said tubular member having a pair of closely adjacent external annular grooves located closely adjacent the plane of said other side and a similar pair of grooves located between said first-mentioned pair and said end portion to facilitate bulbing of the metal between said pairs of grooves and the metal between said second-mentioned pair and said end portion.

4. A rivet assembly comprising, in combination, a tubular member adapted to be inserted into a structure from one side thereof and extending beyond the other side thereof and a pin within said tubular member constructed to engage and draw the end portion of said tubular member at said other side toward said structure, said tubular member having external annular grooves rolled into that portion of said member located between said other side and said end portion to provide prebent portions hugging the pin and thereby predetermining the location of the bulbing of metal.

5. A rivet assembly comprising, in combination, a tubular member adapted to be inserted into a structure from one side thereof and extending beyond the other side thereof and a pin within said tubular member threaded into the end portion of said tubular member at said other side, said pin being adapted to draw said end portion toward said structure, said tubular member having external annular grooves rolled into that portion of said member located between said end portion and said other side to provide prebent inwardly projecting portions facilitating bulbing of the metal when said end portion is drawn toward said structure, the rolling of grooves forming internal annular ribs on said tubular member, said pin being threaded from its end to a point located substantially at said other side of the structure whereby the threaded portion will readily pass the internal ribs.

6. A rivet assembly comprising, in combination, a tubular member adapted to be inserted into a structure from one side thereof and provided with a head at said one side and extending beyond the other side, and a pin within said tubular member constructed to engage and draw the end portion of said tubular member at said other side toward the structure, said tubular member having a plurality of spaced external annular grooves located between said head and said end portion to cause the metal at said grooves to bend inwardly and the metal between said grooves to bend outwardly, the outward bending of the metal within said structure being limited by said structure to form a tight fit and the outward bending of metal outside of said structure producing a bulbed portion extending over the face of said structure at said other side.

7. A rivet assembly comprising, in combination, a tubular member adapted to be inserted into a structure from one side thereof and provided with a head at said one side and extending beyond the other side, and a pin within said tubular member constructed to engage and draw the end portion of said tubular member at said other side toward the structure, said tubular member having a plurality of spaced pairs of external annular grooves located between said head and said end portion to cause the metal at said pairs of grooves to bend inwardly and the metal between said pairs to bend outwardly, said structure limiting the outward bending of that portion of the tubular member lying within the structure, and the portion of the tubular member extending outside of said structure bulbing outwardly over the face of said structure.

8. A rivet assembly comprising, in combination, a tubular member adapted to be inserted into a structure from one side thereof and having a head at said one side, said tubular member extending beyond the other side, and a screw within the tubular member having a straight shank portion and a threaded portion threaded into the end portion of said tubular member at said other side for drawing said end portion of the tubular member toward said structure, said tubular member having a plurality of external annular grooves located between said head and the threaded portion of the tubular member, the grooves opposite the threaded portion of the screw being rolled and thereby forming internal ribs on the tubular member passing over the threads on the screw, and the grooves opposite the shank portion of the screw being cut to avoid deformation of the interior of the tubular member and thereby permit the shank portion of the tubular member to fit snugly within the tubular member.

9. A rivet assembly comprising, in combination, a tubular member adapted to be inserted into a structure from one side thereof and extending beyond the other side, said tubular member having a threaded portion at the end of its extending portion, and a screw within the tubular member threaded into said threaded portion for drawing said threaded portion toward the structure to cause bulbing of the tubular member between said structure and said threaded portion, said tubular member having an external annular groove opposite the threaded portion and spaced a short distance from the bulbed portion to cause the end of the threaded portion adjacent the bulbed portion to bell outwardly and reinforce the bulbed portion.

10. A rivet assembly comprising, in combination, a tubular member adapted to be inserted into a structure from one side thereof and extending beyond the other side, the extending part of the tubular member comprising an end portion of greater wall thickness than the intermediate portion located between said structure and said end portion, and a pin within said tubular member and engaging said end portion for drawing it toward said structure to bulb said intermediate portion outwardly, said end portion having an external annular groove spaced a short distance from said intermediate portion and causing the metal between said groove and said intermediate portion to bell outwardly and merge with the bulb and thereby reinforce the bulb.

11. A rivet assembly comprising, in combination, a tubular member adapted to be inserted into a structure from one side thereof and extending beyond the other side, said tubular member having a head at said one side, and a screw extending through said tubular member and having a head at said one side and in threaded engagement with the end of the tubular member at said other side, said tubular member having a plurality of external annular grooves to cause the metal at said grooves to hug the screw as the latter is tightened and to cause the metal between the grooves to bulb outwardly, the outward bulbing within the structure being limited thereby to cause the rivet to fit tightly within the structure.

12. A rivet assembly comprising, in combination, a tubular member adapted to be inserted into a structure from one side thereof and extending beyond the other side, said tubular member having a head abutting said one side of the structure and being internally threaded at its other end, and a pin extending through said tubular member in threaded engagement therewith, said pin having a portion extending beyond the said head and shaped for gripping whereby the pin may be pulled and the reactionary force applied to said head to cause the tubular member to buckle and bulb outwardly, said tubular member having a plurality of external annular grooves to predetermine the points of bulbing, and said pin being shaped for ready severance at a point flush with said head when the rivet is set.

13. The method of making a rivet, which comprises providing a tubular member for insertion into the structure to be riveted and to extend beyond one side thereof, the extending portion being adapted to be bulbed outwardly, and forming a pair of slightly spaced external annular grooves in said member to cause the metal to bulb on both sides of said pair of grooves and to increase the amount of metal included in the bend connecting the bulbed portions.

14. The method of making a rivet, which comprises providing a tubular member for insertion into the structure to be riveted and to extend beyond one side thereof, the extending portion being adapted to be bulbed outwardly, and rolling a plurality of external annular grooves into said tubular member to partially form bends in the metal to predetermine the location of the bulbing.

15. The method of making a rivet, which comprises providing a tubular member for insertion into the structure to be riveted and to extend beyond one side thereof, internally threading the end portion of the extending part of the member to receive a screw for drawing said end portion toward the structure and outwardly bulb the tubular member between said end portion and said structure, and cutting an external annular groove in said end portion to cause the metal between the groove and the bulbed portion to bell outwardly and merge into the bulbed portion.

HOWARD J. EKLUND.